(12) United States Patent
Hiwatashi

(10) Patent No.: US 8,794,687 B2
(45) Date of Patent: Aug. 5, 2014

(54) SADDLE TYPE VEHICLE HAVING AN ACCOMMODATION BOX

(75) Inventor: Dai Hiwatashi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 175 days.

(21) Appl. No.: 13/340,778

(22) Filed: Dec. 30, 2011

(65) Prior Publication Data

US 2012/0175906 A1 Jul. 12, 2012

(30) Foreign Application Priority Data

Jan. 11, 2011 (JP) .................................. 2011-003281

(51) Int. Cl.
- B62K 7/04 (2006.01)
- B62K 19/40 (2006.01)
- B60R 16/04 (2006.01)

(52) U.S. Cl.
USPC .......................... 296/37.15; 224/413; 224/902

(58) Field of Classification Search
CPC ............. B60R 16/04; B62H 1/02; B62J 9/00; B62K 7/04; B62K 19/40; B62K 19/46; B62K 2202/00; B62K 2208/00
USPC ......... 180/68.5; 224/413, 419, 423, 427, 428, 224/431, 433, 435, 440, 451, 452, 453, 224/902; 296/37.1, 37.15
See application file for complete search history.

(56) References Cited

U.S. PATENT DOCUMENTS

| | | | | |
|---|---|---|---|---|
| 3,779,597 A | * | 12/1973 | Uchida | 296/37.15 |
| 4,666,009 A | * | 5/1987 | Yashima et al. | 180/68.5 |
| 6,357,542 B1 | * | 3/2002 | Sako | 180/68.5 |
| 6,588,529 B2 | * | 7/2003 | Ishii et al. | 180/219 |
| 7,219,939 B2 | * | 5/2007 | Kamemizu et al. | 296/37.1 |
| 7,490,693 B2 | * | 2/2009 | Oshima et al. | 180/309 |
| 2013/0249233 A1 | * | 9/2013 | Yokouchi et al. | 296/37.15 |

FOREIGN PATENT DOCUMENTS

| | | | | |
|---|---|---|---|---|
| CN | 201154741 Y | | 11/2008 | |
| FR | 2698603 A1 | * | 6/1994 | ............. B62K 19/46 |
| FR | 2709455 A1 | * | 3/1995 | ............. B60R 16/04 |
| FR | 2712432 A1 | * | 5/1995 | ............. H01R 13/68 |
| JP | 04353087 A | * | 12/1992 | ............. B62J 11/00 |
| JP | 05008775 A | * | 1/1993 | ................ B62J 9/00 |
| JP | 2002-205673 | | 7/2002 | |

* cited by examiner

*Primary Examiner* — Glenn Dayoan
*Assistant Examiner* — Paul Chenevert
(74) *Attorney, Agent, or Firm* — Squire Patton Boggs (US) LLP (57) ABSTRACT

A saddle-type vehicle includes an accommodation box, left and right rear frames, a seat, and an electric part accommodation section. The rear frames are disposed at a rear portion of the accommodation box, adjacent an opening of the accommodation box. A rear cross frame connects the left and right rear frames to each other, and the electric part accommodation section is at least partially disposed inside of the accommodation box at a location which is disposed below the rear cross frame.

20 Claims, 11 Drawing Sheets

SADDLE TYPE VEHICLE HAVING AN ACCOMMODATION BOX

BACKGROUND

1. Field

The present invention relates to a saddle type vehicle wherein an electric part accommodation section for accommodating an electric part therein is provided rearwardly of an accommodation box disposed below a seat.

2. Description of the Related Art

A vehicle including an accommodation box which is disposed below a seat and in which an upper opening which is open upwardly and a rear frame which passes sidewardly of a lower portion of the accommodation box and extends rearwardly of the vehicle is known generally. Such a vehicle can be, for example, a saddle-ride type vehicle such as a motorcycle.

In order to enable a maintenance performance of an electric part, an inspection hole is provided in a rear wall of the accommodation box and a tray for disposing an electric part therein is provided on a rear frame rearwardly of the accommodation box such that an electric part is disposed on the tray. Such a configuration is disclosed for example, in Japanese Patent Laid-Open No. 2002-205673 (Patent Document 1).

However, in the prior art described above, there is a subject that, where the rear frame extends rearwardly of the accommodation box past the proximity of the upper opening of the accommodation box, since the space above the rear frame rearwardly of the accommodation box is reduced, it is difficult to assure an electric part accommodation space.

SUMMARY

The present invention has been made in view of such a situation as described above, and it is an object of the present invention to provide, in a saddle type vehicle wherein a rear frame extends rearwardly of an accommodation box past the proximity of an upper opening of the accommodation box, an electric part accommodation space whose maintenance performance is good.

In order to achieve the object described above, according to embodiments of the present invention, a saddle type vehicle can include a pair of left and right rear frames disposed at a rear portion of a vehicle so as to extend in a forward and rearward direction. An accommodation box can be disposed between the paired left and right rear frames and having an upper opening provided therein which is open at an upper portion thereof. A seat, such as a driver-seated seat is supported for opening and closing the upper opening. An electric part accommodation section can be provided, having a maintenance opening provided therein which is open to the accommodation box side. A maintenance lid can be adapted to close up the maintenance opening section. At a rear portion of the accommodation box, the rear frames are disposed in the proximity of the upper opening. A rear cross frame connects rear portions of the left and right rear frames to each other with respect to the accommodation box. The electric part accommodation section is disposed below the rear cross frame and is supported on the accommodation box.

Since the rear cross frame which connects portions of the left and right rear frames rearwardly of the accommodation box is provided and the electric part accommodation section is disposed in a dead space below the rear cross frame, even if the rear frames extend rearwardly of the accommodation box past sidewardly of an upper portion of the accommodation box, the electric part accommodation space, which is good in maintenance performance, can be assured.

The electric part accommodation section may be supported on the rear cross frame.

Since the electric part accommodation section can be supported by both of the accommodation box and the rear cross frame, even if a heavy article is disposed in the electric part accommodation section, it can be supported firmly.

The electric part accommodation section may be attached to the rear frame in a state in which the electric part accommodation section is integrated with the accommodation box.

Since the electric part accommodation section and the accommodation box are attached in an integrated state to the rear frames, handling upon attachment is facilitated, and the attaching work is therefore simplified.

The electric part accommodation section and the accommodation box may be individually formed from resin and the electric part accommodation section may be attached to the accommodation box by welding, adhesive, or other suitable attachment method.

The electric part accommodation section can be supported firmly while the electric part accommodation section and the accommodation box are reduced in weight.

A battery may be accommodated in the electric part accommodation section. The battery may be disposed such that an electrode of the battery is exposed as viewed in top plan in a state in which the maintenance lid is open.

In a state in which the seat is open and the maintenance lid is opened, the electrode of the battery is exposed as viewed in top plan; it is thus possible to access the electrode of the battery from above. Also, since light from above is not intercepted and it becomes bright around the electrode of the battery, an attaching work or a removing work of an electric wire connected to the electrode of the battery is facilitated.

On a face of the maintenance lid on the battery side, a swollen portion swollen so as to contact with the battery may be provided, and, on a face on the opposite side to the battery, a recessed portion may be provided at a position corresponding to the swollen portion.

Since the swollen portion contacts with the battery, the battery can be held by the swollen portion to prevent displacement or vibration of the battery. Since the recessed portion is provided on the face on the opposite side to the battery, when the maintenance lid is to be removed from the opposite side to the battery, the maintenance lid can be held readily and the operability is improved.

The maintenance lid may include a fuse accommodation section sidewardly of the swollen section.

A fuse can be accommodated in a dead space sidewardly of the swollen portion, and the fuse can be accommodated in a compact and efficient manner.

The electric part accommodation section may overlap with the rear frame in a side view.

Since the rear frame is positioned sidewardly of the battery, the battery can be protected by the rear frame.

According to embodiments of the present invention, since the rear cross frame which connects the rear portions of the left and right rear frames with respect to the accommodation box is provided and the electric part accommodation section is disposed in a dead space below the rear cross frame, even if the rear frame is extended rearwardly of the accommodation box passing sidewardly of the upper portion of the accommodation box, the electric part accommodation space whose maintenance performance is good can be secured.

If the electric part accommodation section is supported by the rear cross frame, then since the electric part accommodation section is supported by both of the accommodation box and the rear cross frame, the load withstanding property of the electric part accommodation section is enhanced.

If the electric part accommodation section is attached to the rear frame in a state in which it is integrated with the accommodation box, then handling upon attachment can be facilitated and the attachment work is facilitated.

If both of the electric part accommodation section and the accommodation box are made of resin and the electric part accommodation section is attached to the accommodation box by welding or adhesion, then the electric part accommodation section can be supported firmly while the electric part accommodation section and the accommodation box are reduced in weight.

If a battery is accommodated in the electric part accommodation section and the battery is disposed such that the electrode of the battery is exposed as viewed in top plan in a state in which the maintenance lid is opened, then the electrode of the battery can be accessed from above in a state in which the maintenance lid is opened. Further, since light from above is not intercepted or blocked and it becomes bright in the proximity of the electrode of the battery, connection or disconnection of an electric wire connected to the electrode of the battery is facilitated.

Since, if the maintenance lid includes the swollen portion swollen so as to contact with the battery on the face thereof on the battery side and includes the recessed portion at the position corresponding to the swollen portion on the face on opposite side to the battery, then the swollen portion contacts with the battery, the battery can be held by the swollen portion so that positional displacement and vibration of the battery can be prevented. Further, since the recessed portion is provided on the face opposite side to the battery, when the maintenance lid is to be removed from the opposite side to the battery, the maintenance lid can be held readily and the working performance is improved.

If the maintenance lid includes the fuse accommodation section sidewardly of the swollen portion, then a fuse can be accommodated in a dead space sidewardly of the swollen portion, and the fuse can be efficiently accommodated.

If the electric part accommodation section is configured so as to overlap with the rear frame as viewed in side elevation, then the rear frame is positioned sidewardly of the battery, and therefore, the battery can be protected by the rear frame.

DETAILED DESCRIPTION

A motorcycle according to an embodiment of the present invention will be described below with reference to the drawings. It is to be noted that, in the following description, upward, downward, forward, rearward, leftward and rightward directions are directions as viewed from the driver of the vehicle.

Figure 1:
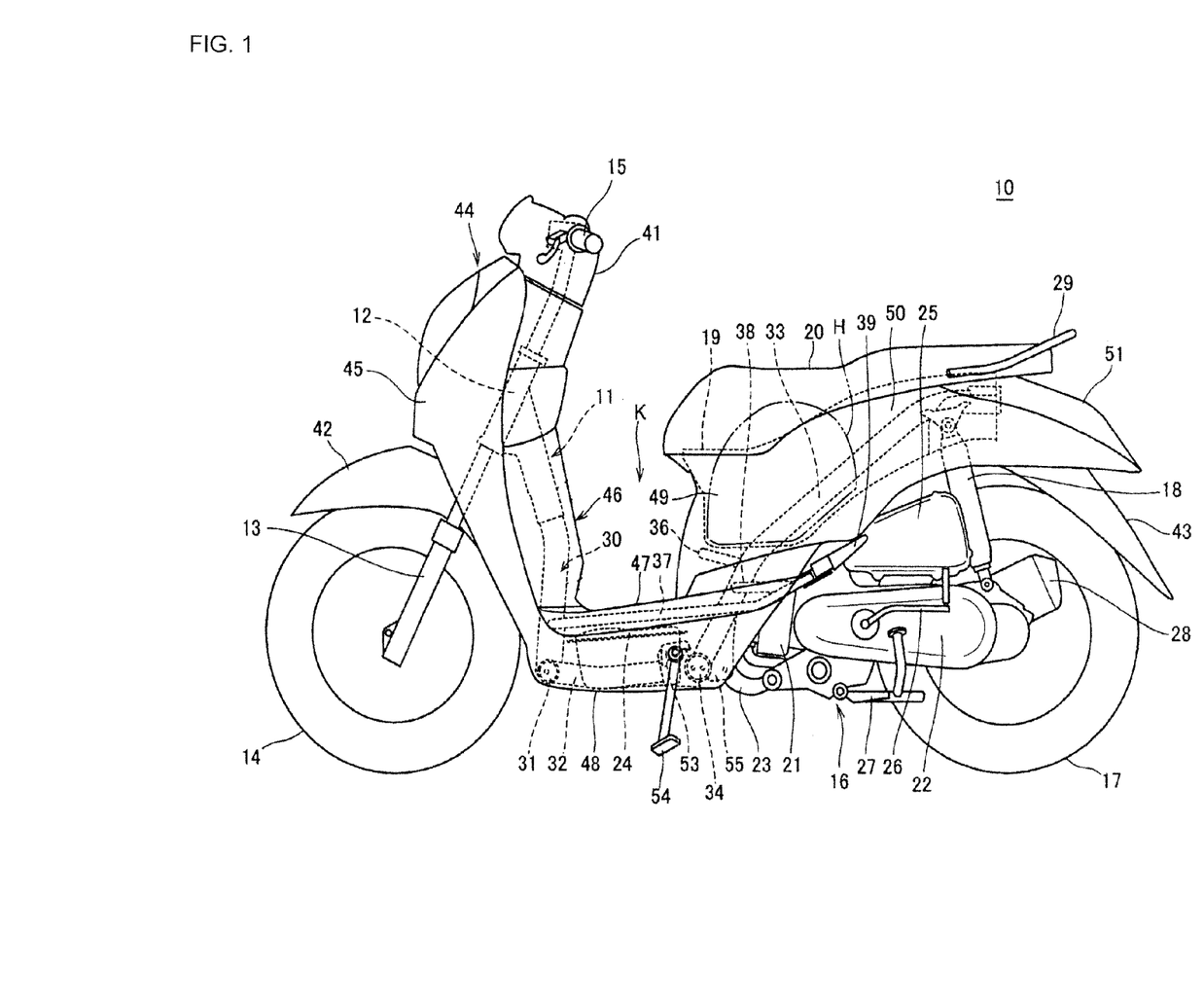
FIG. 1 is a side elevational view of a motorcycle according to an embodiment of the present invention.

FIG. 1 is a left side elevational view of the motorcycle according to an embodiment of the present invention. The motorcycle 10 can be a saddle type vehicle of the scooter type including, as main components thereof, a vehicle body frame 11, a pair of left and right front forks 13 attached to a head pipe 12 at a front portion of the vehicle body frame 11, a front wheel 14 attached to a lower end of the front forks 13, and a handle bar 15 connected to an upper portion of the front forks 13. A power unit 16 can be attached for upward and downward swinging movement to an intermediate portion in the forward and backward direction of the vehicle body frame 11. A rear wheel 17 can be attached to a rear portion of the power unit 16, and a rear suspension unit 18 extending between a rear end portion of the power unit 16 and a rear portion of the vehicle body frame 11. An accommodation box 19 can be attached to a rear portion of the vehicle body frame 11, and a seat 20 is disposed above the accommodation box 19 and on which the driver is seated. A fuel tank 24 is provided, as is a body cover 44 made of resin for covering the vehicle body frame 11.

Figure 2:
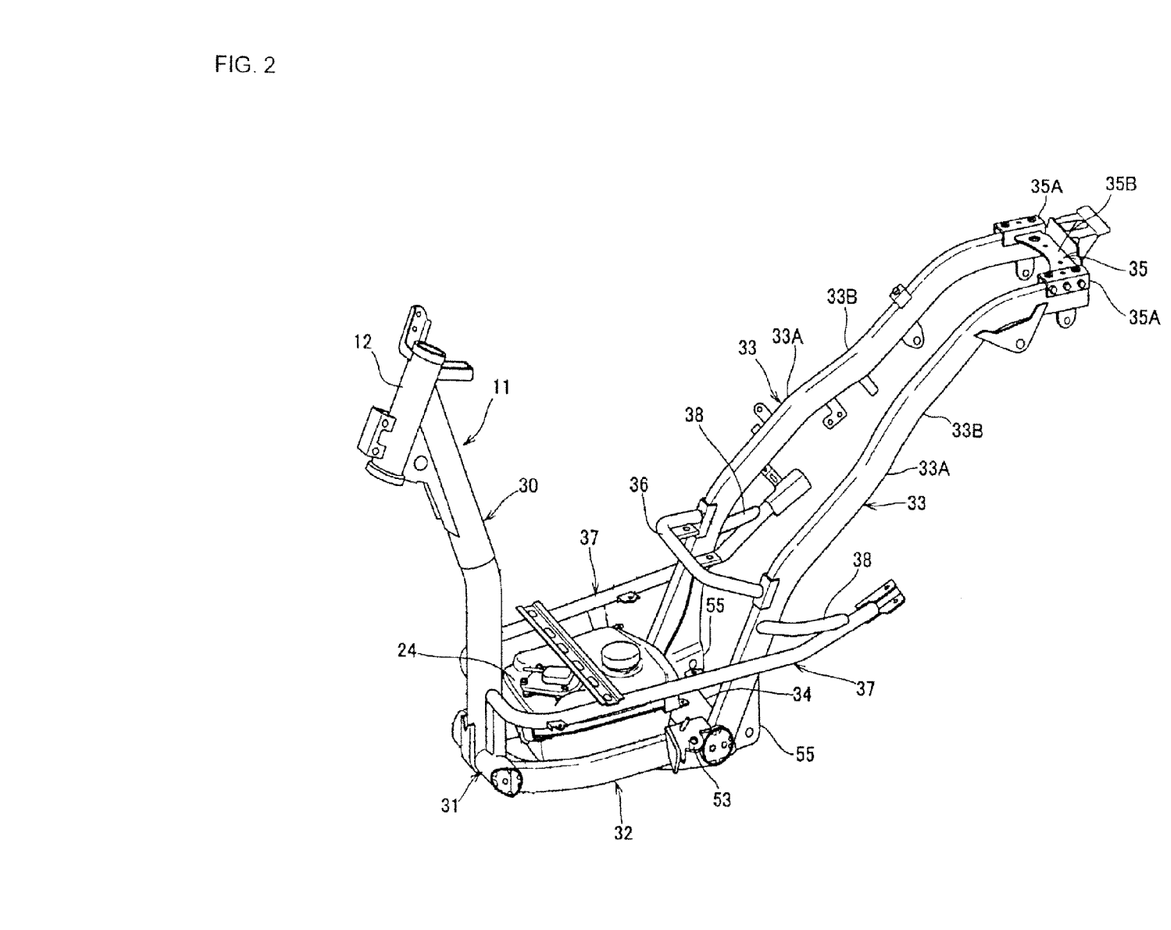
FIG. 2 is a view showing a frame of the motorcycle.

FIG. 2 is a perspective view of the vehicle body frame 11. The vehicle body frame 11 includes a head pipe 12, one main frame 30 extending from a rear face of the head pipe 12 in the rearward and downward direction. A front cross frame 31 connected to a lower portion of the main frame 30 extends in a vehicle widthwise direction. A pair of left and right lower frames 32, 32 extend from the left and right ends of the front cross frame 31 in a rearward direction. A center cross pipe 34 is provided at a rear portion of the lower frames 32 and 32 and connecting the pair of left and right lower frames 32, 32 to each other, and rear frames 33, 33 extending rearwardly upwards from the center cross pipe 34 to a vehicle rear portion.

The steering system including the front wheel 14 and the front fork 13 are supported for pivotal motion by a steering shaft (not shown) supported for rotation on the head pipe 12.

A rear cross frame 35 which connects the left and right rear frames 33, 33 to each other is provided at a rear end of the rear frames 33, 33. A cross pipe 36 which connects the left and right rear frames 33, 33 is provided at a rear inclined portion rather near to the front end of the rear frames 33, 33.

A pair of left and right floor frames 37, 37 which connect the main frame 30 and the left and right rear frames 33, 33 are provided above the left and right lower frames 32, 32. The floor frames 37, 37 are connected at a rear portion thereof to pillion step brackets 38, 38 which project in the vehicle widthwise direction from the floor frames 37, 37. Pillion steps 39 (FIG. 1) on which a passenger seated at a rear portion of the seat 20 places the feet thereof are attached to the pillion step brackets 38, 38.

A side stand bracket 53 is provided on the left side lower frame 32, and a foldable side stand 54 (FIG. 1) is attached to the side stand bracket 53. Further, a power unit connection portion 55 to which the power unit 16 is connected is provided on a rear face of a front portion of the rear frames 33, 33.

As shown in FIG. 1, the power unit 16 has an engine 21 at a front portion thereof, and a power transmission mechanism 22 connected to a rear portion of the engine 21 for driving the rear wheel 17, and is connected for rocking motion to the power unit connection portion 55 through a link 23 connected to a front portion thereof. The power unit 16 can be a unit swing engine which extends rearwardly below the rear frames 33 and which supports the rear wheel 17 for rotation. The unit can also function as a swing arm for supporting the rear wheel 17 for rotation.

An air cleaner box 25 which purifies air taken therein and supplies the purified air to the engine 21 is connected to an upper portion of the power unit 16. A muffler 28 extending from the engine 21 is disposed rightwardly sidewardly of the rear wheel 17.

Further, a kick pedal 26 for starting the engine 21 by kicking is provided on a left side face of the power unit 16, and a main stand 27 which supports the motorcycle 10 in an uprightly standing state is attached to a lower portion of the power unit 16.

The body cover 44 includes a front cover 45 which covers the head pipe 12 and the main frame 30 from the front. A leg shield 46 is connected to the front cover 45 and covers the head pipe 12 and the main frame 30 from the rear. A step floor 47 connects to a lower portion of the leg shield 46 and covers the left and right floor frames 37, 37 from above. A floor under cover 48 connects to a lower portion of the front cover 45 and covers the step floor 47 from below. A seat under cover 49 covers a front portion of the accommodation box 19. A pair of left and right rear covers 50 cover the rear frames 33, 33 and the accommodation box 19 from the opposite sides. Also, a tail cover 51 covers a rear face of the vehicle below the seat 20.

Left and right side face portions of the floor under cover 48 cover the lower frames 32, 32 and the floor frames 37, 37 from the opposite sides.

The handle bar 15 can be covered, over a periphery thereof, with a handle cover 41. A front fender 42 which covers the front wheel 14 from above is provided on the front fork 13, and a rear fender 43 which covers the rear wheel 17 from above is provided below the rear cover 50. The accommodation box 19 is opened and closed by the seat 20 attached for opening and closing motion, and a grab bar 29 is provided at a rear portion of the seat 20. The fuel tank 24 as an energy storage box for reserving fuel for the engine 21 is disposed below the step floor 47.

Figure 3:
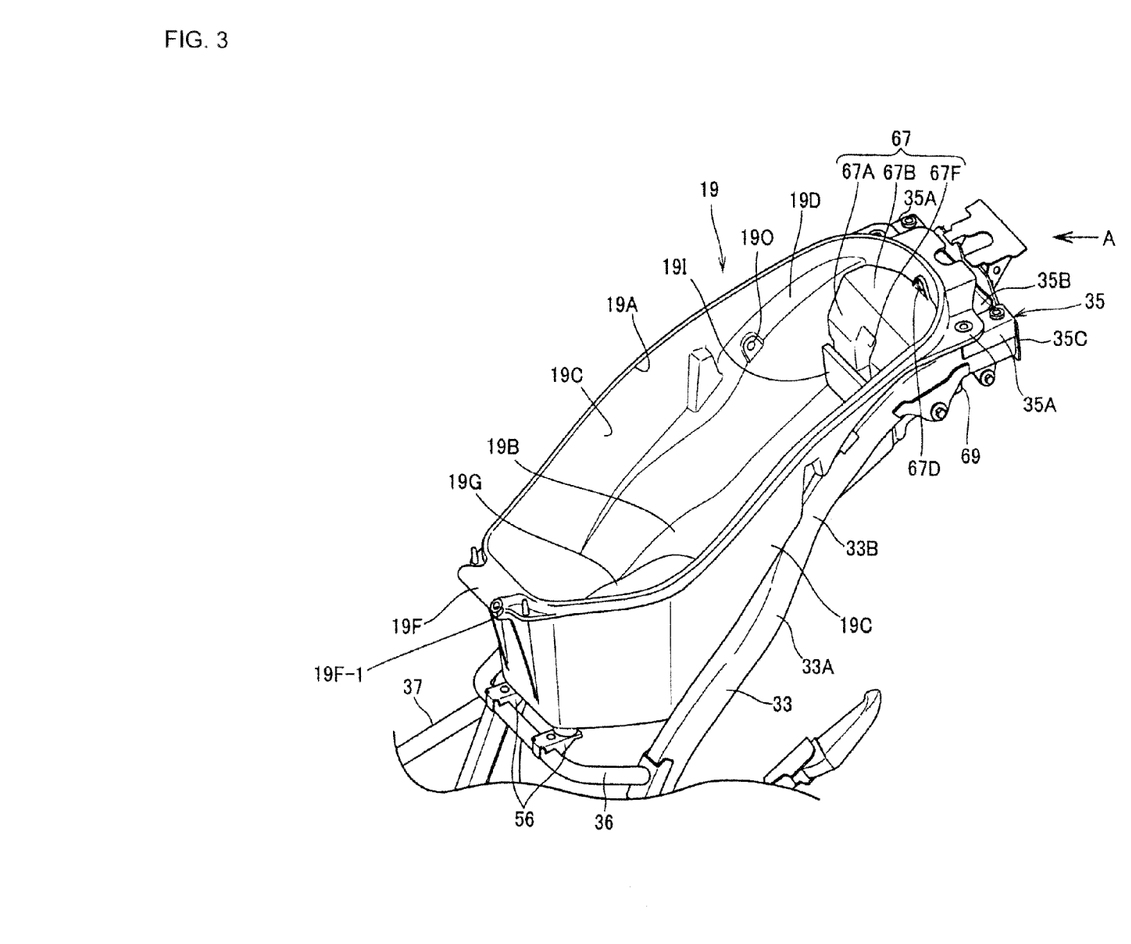
FIG. 3 is a perspective view of an accommodation box.

FIG. 3 is a perspective view illustrating a state in which the accommodation box 19 is attached between the left and right rear frames 33. The accommodation box 19 is a case body which extends along the rear frames 33 and has a large upper face opening (upper opening) 19A provided at an upper face thereof and accommodates, for example, a helmet H (FIG. 1) at a front portion thereof while it accommodates luggage or the like at a rear portion thereof.

Figure 8:
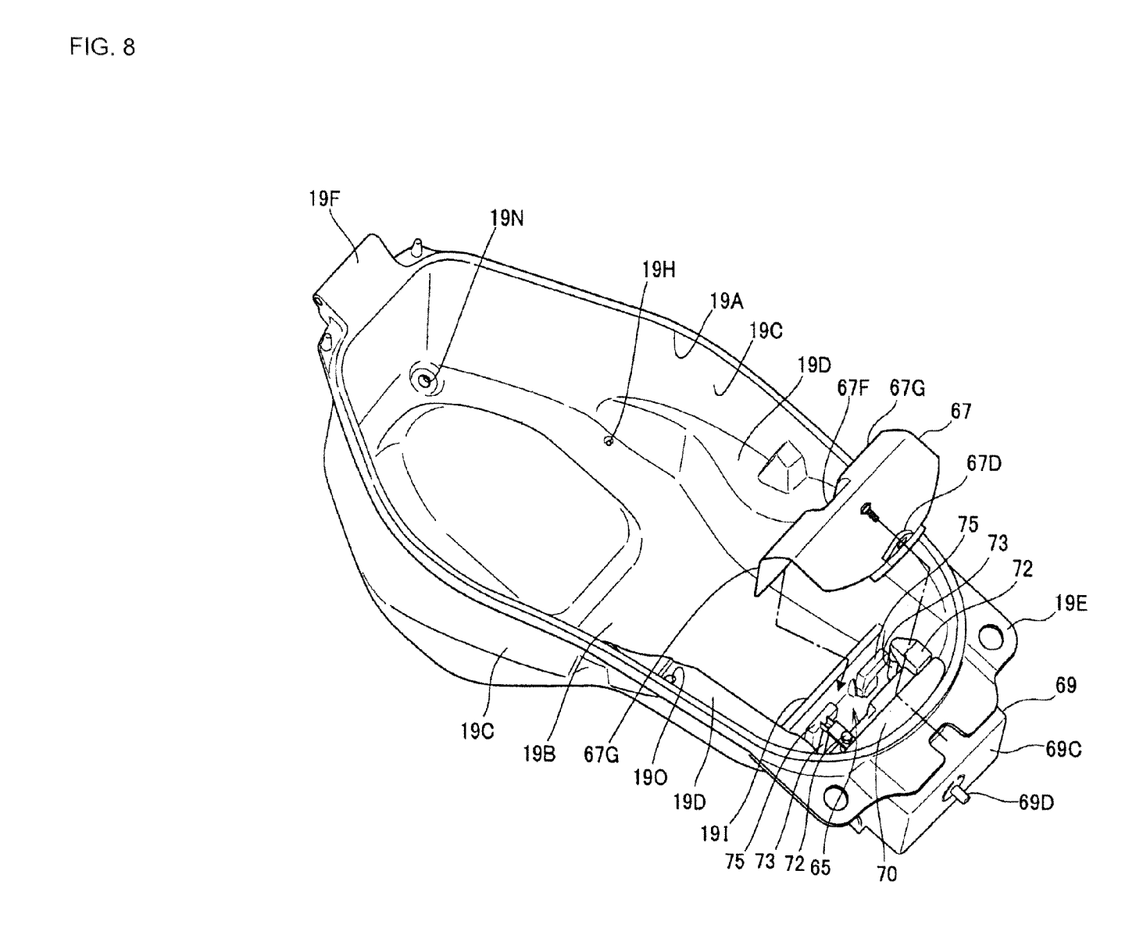
FIG. 8 is a perspective view illustrating a state in which a maintenance lid is removed.

A maintenance lid 67 is provided at a rear end portion of the accommodation box 19. A space 65 for maintenance is formed on the inner side of the maintenance lid 67 as shown in FIG. 8 hereinafter described, and electrodes 72 of a battery 70 and a fuse 75 hereinafter described are exposed to the space 65 for maintenance.

As shown in FIG. 1, the left and right rear frames 33 extend, as viewed in side elevation, radically rearwardly upwards from the center cross pipe 34 to the proximity of the cross pipe 36, is bent in the proximity of the cross pipe 36 and extends at a moderate inclination angle, and is bent again and extends in a substantially horizontal direction until it comes to an end thereof. The distance between the left and right rear frames 33 is substantially uniform within a range from the center cross pipe 34 to a first bent portion 33A past the cross pipe 36 and gradually decreases to a second bent portion 33B as they are bent to the inner side in the widthwise direction at the first bent portion 33A, and then is kept uniform with the reduced dimension while the rear frames 33 extend from the second bent portion 33B to the rear end.

Figure 9:
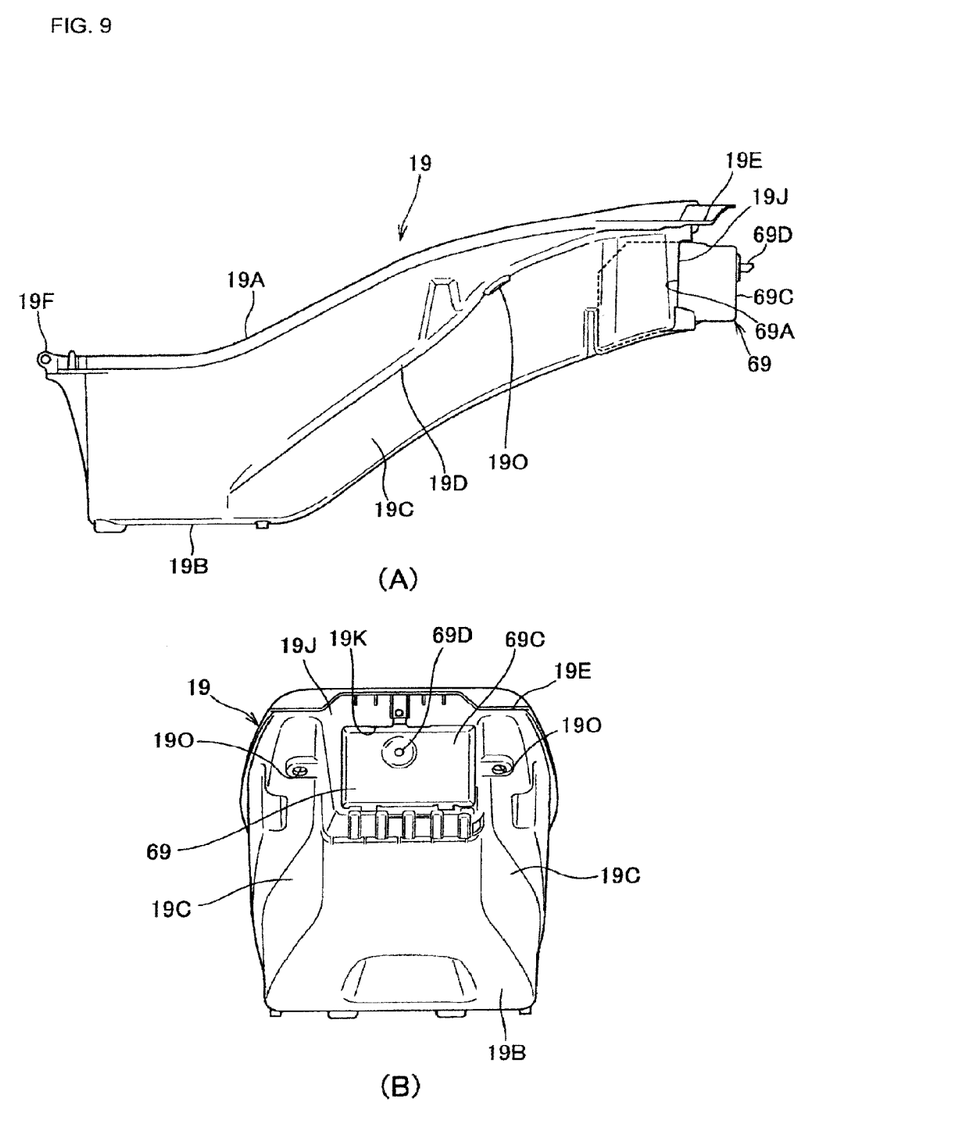
FIG. 9A is a left side elevational view of an accommodation box body and FIG. 9B is a rear elevational view of the same.

As shown in FIG. 3, the accommodation box 19 is disposed at a portion of the rear frames 33 within a range from a front portion of the rear frames 33 in the proximity of the cross pipe 36 to a portion of the rear frames 33 in the proximity of the rear cross frame 35 such that it is fitted between the left and right rear frames 33. In particular, the accommodation box 19 overlaps with the rear frames 33 as viewed in side elevation as shown in FIGS. 1 and 9. At a front portion of the accommodation box 19, the rear frames 33 pass in the proximity of a bottom portion 19B, and at a rear end portion of the accommodation box 19, the rear frames 33 pass in the proximity of the upper face opening 19A.

The accommodation box 19 can be fixed in the following manner.

Figure 4:
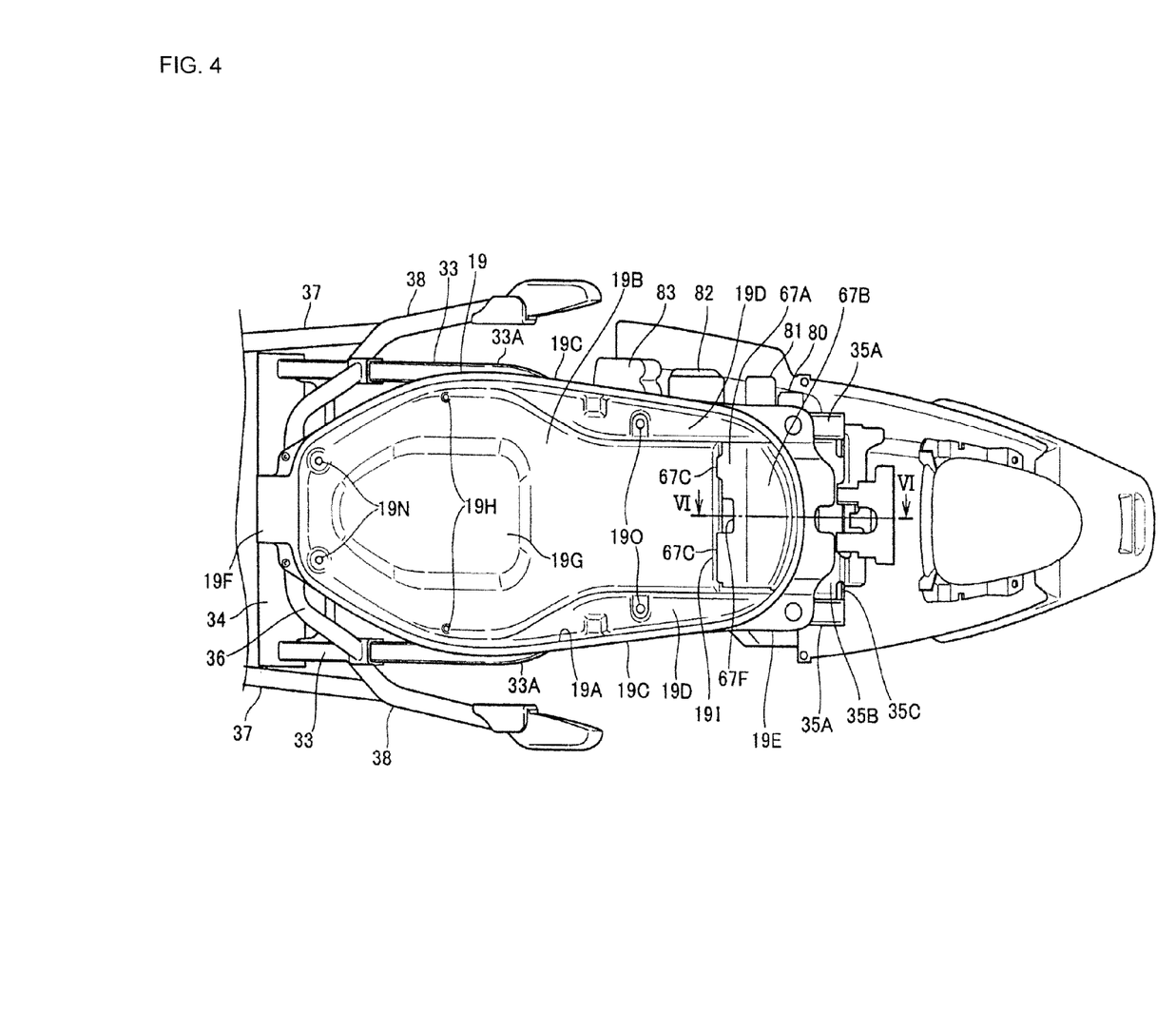
FIG. 4 is a top plan view of the accommodation box.

In particular, a pair of left and right attachment holes 19N are provided at a front end of the bottom portion 19B as shown in FIG. 4, and fixing screws (not shown) extending through the attachment holes 19N are tightened in a pair of left and right supporting stays 56 (FIG. 3) provided on the cross pipe 36. Further, attachment holes 19O are provided also at stepped portions 19D formed on side wall portions 19C, and fixing screws (not shown) extending through the attachment holes 19O are tightened to an upper face of the rear frames 33. Further, a supporting flange 19E is provided integrally at a rear end of the upper face opening 19A such that it overlaps with an upper face of the rear cross frame 35, and this supporting flange 19E is supported on an upper face of an attachment portion 35A of the rear cross frame 35.

At a front end of an upper face of the accommodation box 19, a seat attachment portion 19F is provided, as shown in FIG. 3, for attaching the seat 20 (refer to FIG. 1) for a passenger for opening and closing movement. The main frame 30 is connected at a front end portion thereof for hinged (not shown) opening and closing movement by a support shaft (not shown) fitted in a hole 19F-1 of the seat attachment portion 19F. When the upper face opening 19A of the accommodation box 19 is closed up with the seat 20, an accommodating space for a helmet H, a luggage, an electric part and so forth is formed in the inside of the accommodation box 19.

In the accommodation box 19, as shown in FIGS. 1 and 9A, a front portion of the bottom portion 19B is formed, as viewed in side elevation, at a position lower than the upper face of the seat 20 so that a helmet H can be accommodated therein, and a rear portion of the bottom portion 19B is formed in a rearwardly upwardly inclined relationship in order to assure a space for disposing a part such as an air cleaner therein.

Further, as shown in FIG. 4, the bottom portion 19B of the accommodation box 19 has a front portion formed, as viewed in top plan, in a substantially elliptical shape so as to conform to the shape of a helmet, and a rear portion formed in a substantially rectangular shape in such a manner that it is fitted between the rear frames 33.

Figure 5:
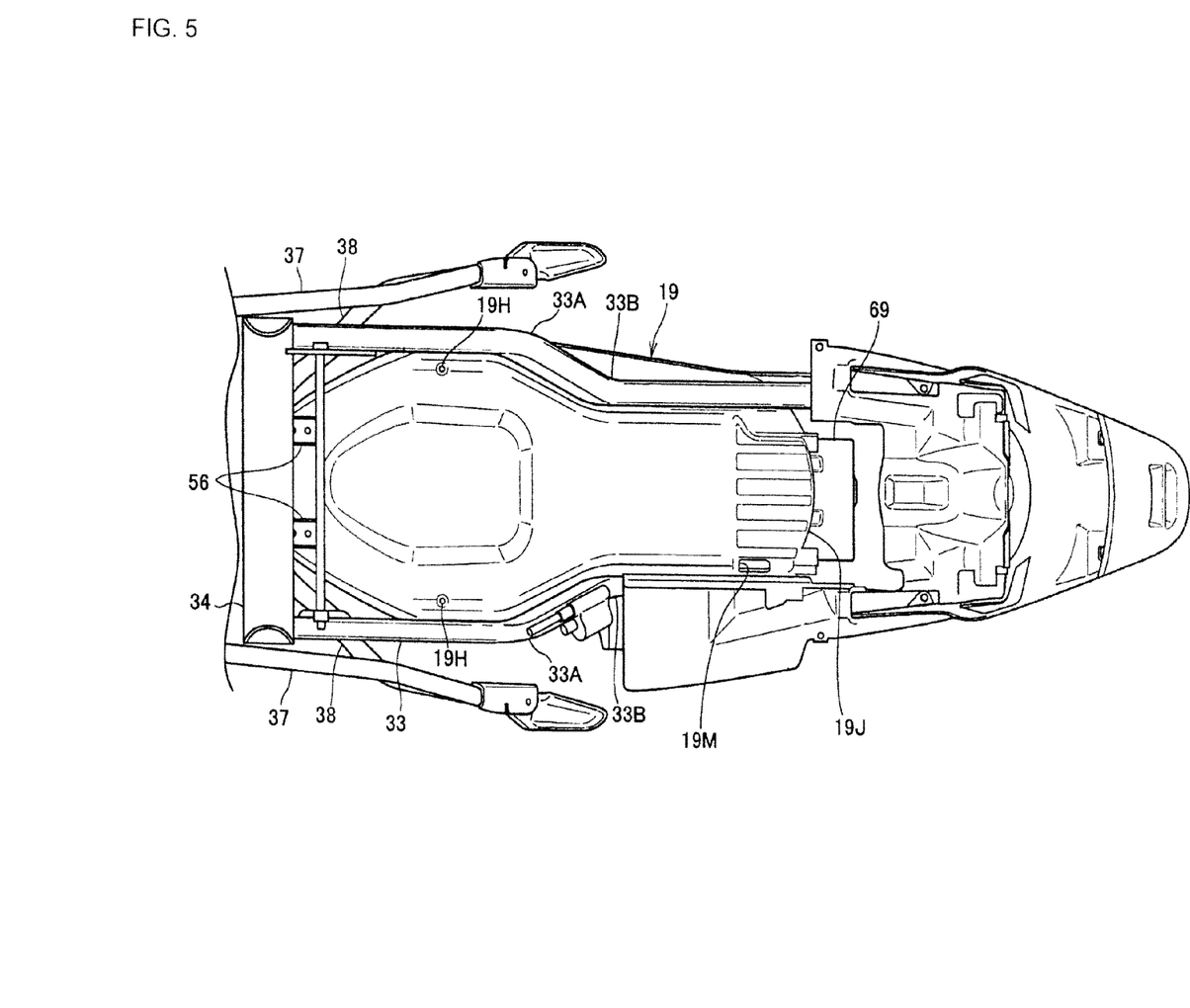
FIG. 5 is a bottom plan view of the accommodation box.

As shown in FIGS. 4 and 5, a recessed portion 19G which is convex to the upper side is provided at a front portion of the bottom portion 19B to assure a disposition space for an electric part. Further, a drain hole 19H is provided at a front portion of the bottom portion 19B. A locking portion 19I for positioning the maintenance lid 67 is provided at a rear portion of the bottom portion 19B.

At each of side wall portions 19C of the accommodation box 19, a stepped portion 19D is formed at a portion rearwardly of the first bent portion 33A from which the width is reduced such that it extends along the upper face of the rear frame 33, and a portion higher than this stepped portion 19D is formed with an increased width such that it extends along an outer side face of the rear frame 33 so that the accommodation capacity may be increased.

Figure 6:
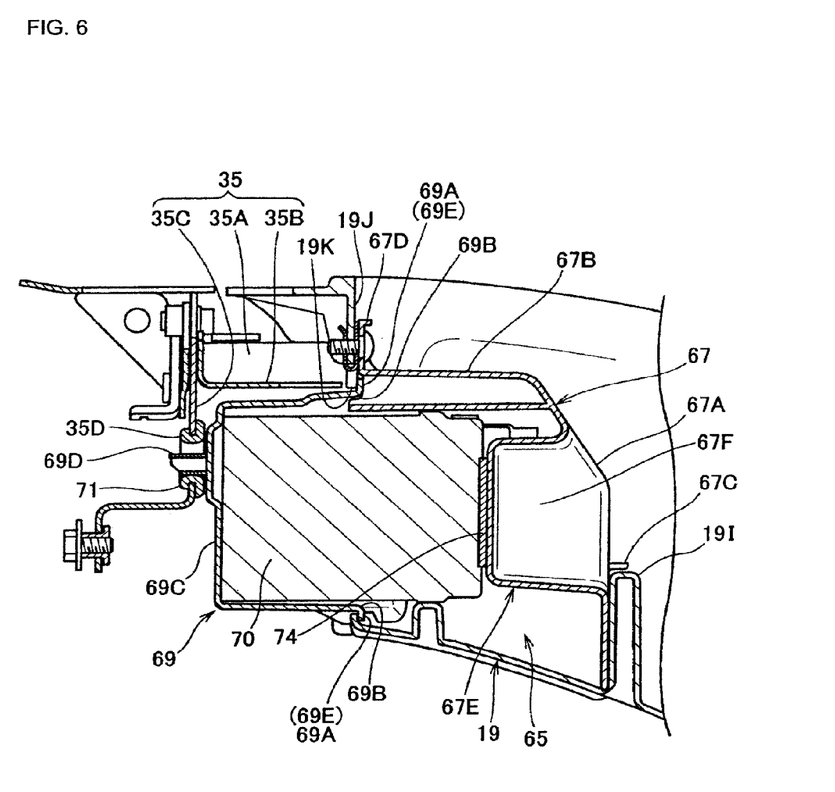
FIG. 6 is a rear perspective view of the accommodation box.

FIG. 6 is a sectional view taken along line VI-VI of FIG. 4.

The space 65 for maintenance extends in the inside of the maintenance lid 67 as described hereinabove, and a sub box (electric part accommodation section) 69 is provided continuously to the space 65. In particular, a rear wall opening 19K is open to a rear wall 19J of the accommodation box 19, and the sub box 69 is provided continuously to the rear wall opening 19K such that it extends downwardly of the rear cross frame 35. The sub box 69 is joined to the rear wall opening 19K of the accommodation box 19.

Figure 7:
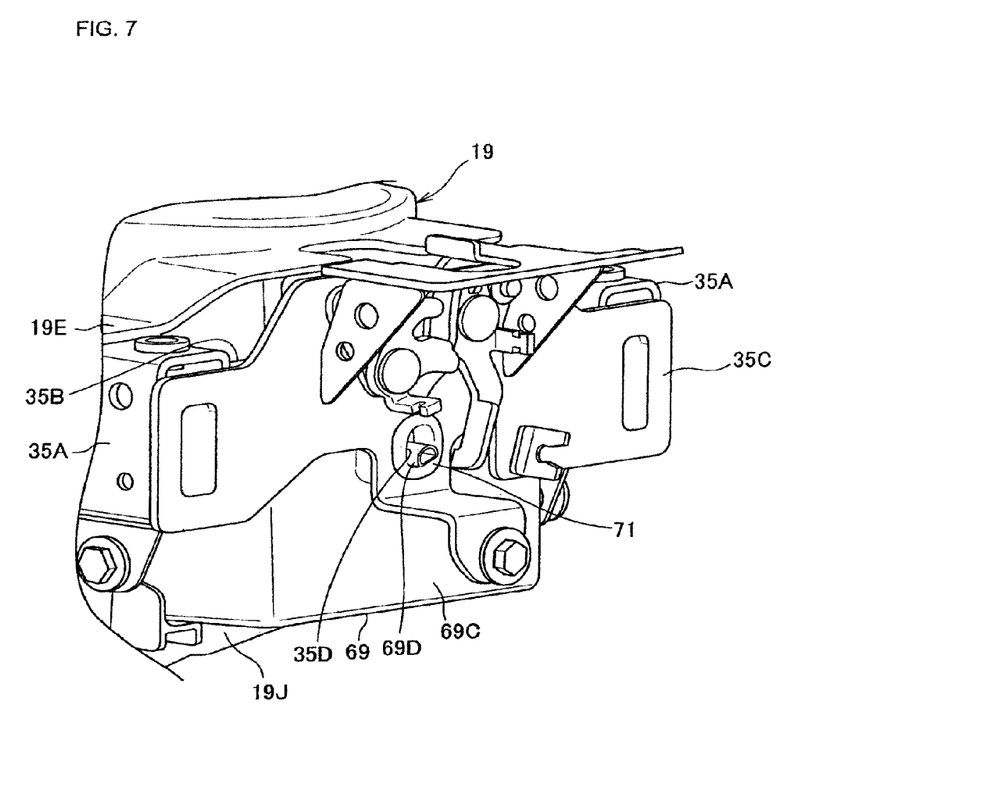
FIG. 7 is a sectional view of a rear portion of the accommodation box.

The sub box 69 is a box-shaped case body and accommodates a battery 70 within an opening 69B. After the battery 70 is accommodated into the inside of the sub box 69, it is positioned by the maintenance lid 67. As shown in FIGS. 5 and 7, the sub box 69 is fitted between rear end portions of the left and right rear frames 33 and positioned below an upper connection plate 35B of the rear cross frame 35 and forwardly of a rear connection plate 35C of the rear cross frame 35. Consequently, a dead space below the rear cross frame 35 can be utilized. The sub box 69 overlaps with the rear frames 33 as viewed in side elevation. Consequently, the battery 70 can be protected by the rear frames 33.

FIG. 7 is a view from a direction of an arrow mark A of FIG. 3. A projection 69D is provided on a rear wall 69C of the sub box 69. Further, a support hole 35D is open to the rear connection plate 35C of the rear cross frame 35, and a rubber member 71 formed from an elastic member is disposed in the support hole 35D. The projection 69D of the sub box 69 is inserted in and fixed to the support hole 35D of the rear cross frame 35 through the rubber member 71 thereby to support the sub box 69. Accordingly, since the projection 69D is supported by the support hole 35D, even if the sub box 69 is pushed down by the self weight of the battery 70, the sub box 69 is supported firmly by the rear cross frame 35.

The accommodation box 19 and the sub box 69 can both be formed from resin. A joining flange 69E is provided on a front wall 69A of the sub box 69 as shown in FIG. 6. The sub box 69 is integrated with the accommodation box 19 by inserting the sub box 69 into the rear wall opening 19K of the rear wall 19J of the accommodation box 19 from forwardly and joining, in a state in which the joining flange 69E is pressed against the rear wall 19J of the accommodation box 19, the front wall 69A of the sub box 69 to the rear wall 19J of the accommodation box 19 by welding or by adhesive as shown in FIG. 9B.

In the present embodiment, the accommodation box 19 and the sub box 69 are fitted in the integrated state by welding or adhesive between the rear frames 33 from forwardly so as to be attached to the rear frames 33. Accordingly, handling upon attachment is facilitated and an attaching operation is simplified.

As shown in FIG. 6, the maintenance lid 67 closes the opening of the space 65 for maintenance and includes a front wall portion 67A and an upper wall portion 67B.

A locking portion 67C can be formed at a front portion of a lower portion of the front wall portion 67A of the maintenance lid 67, and the maintenance lid 67 is positioned by the locking portion 67C locked by the locking portion 19I provided on the bottom portion 19B of the accommodation box 19. An attachment flange 67D is provided at a rear end of the upper wall portion 67B of the maintenance lid 67, and the maintenance lid 67 is secured by the maintenance lid 67 screwed to the rear wall 19J of the accommodation box 19.

A swollen portion 67E is formed on a rear face of the front wall portion 67A of the maintenance lid 67 such that it is swollen rearwardly (to the battery 70 side). A battery cushion 74 made of an elastic material is provided on the swollen portion 67E. The battery cushion 74 is configured to contact the battery 70. In particular, the swollen portion 67E of the maintenance lid 67 contacts with the battery 70 to hold the battery 70. Consequently, the battery 70 can be prevented from moving, and resistance against vibration can be improved.

Further, a recessed portion 67F is provided at a position of a front face of the front wall portion 67A corresponding to the swollen portion 67E such that it is recessed rearwardly (to the battery 70 side). As shown in FIG. 3, the recessed portion 67F of the maintenance lid is exposed to the inside of the upper face opening 19A of the accommodation box 19. Consequently, when an attaching work or a removing work of the maintenance lid 67 is to be carried out, the maintenance lid 67 can be caught readily, and an attaching or removing work of the maintenance lid 67 is facilitated.

Figure 10:
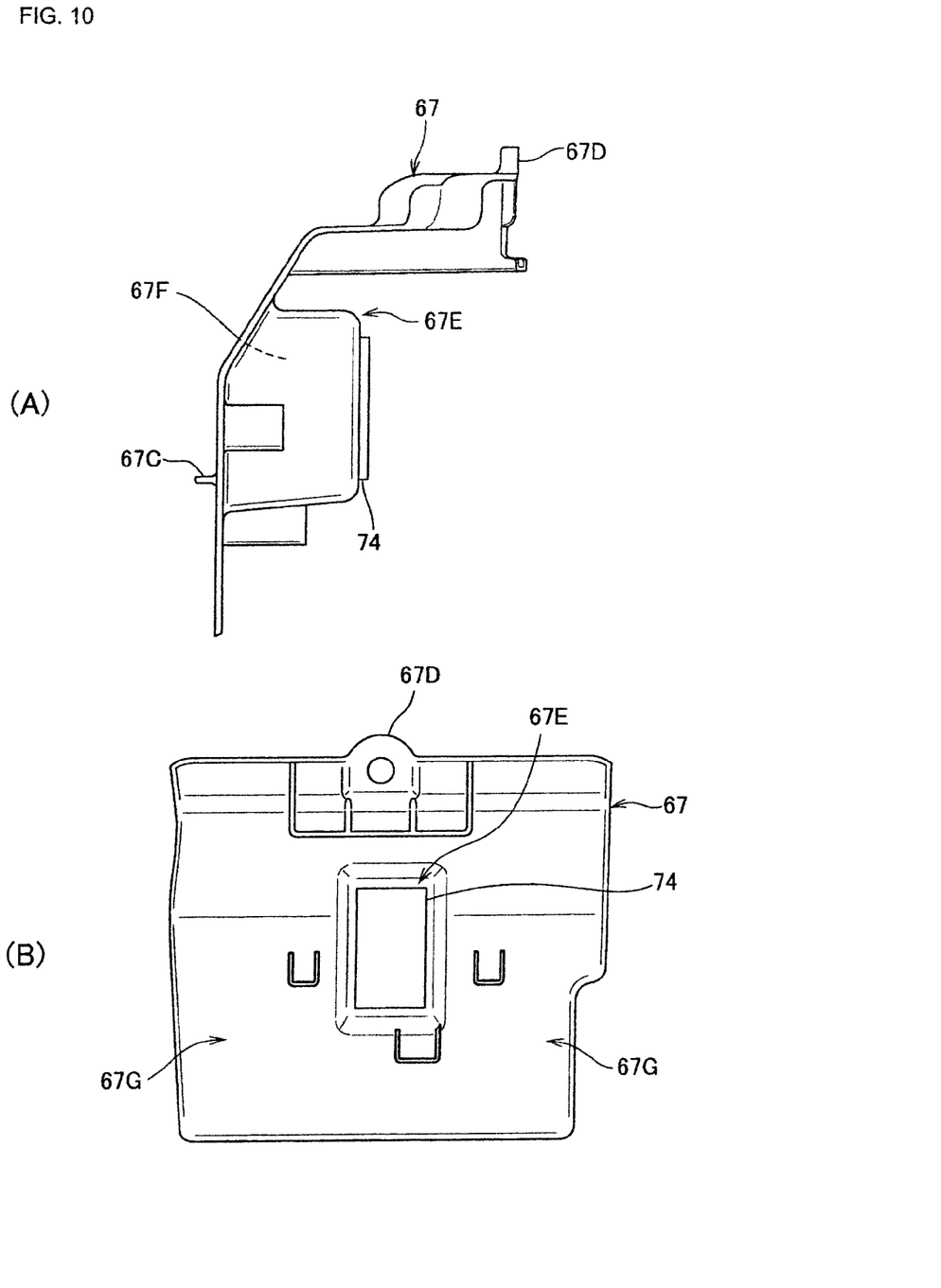
FIG. 10A is a left side elevational view of the maintenance lid and FIG. 10B is a rear elevational view of the same.

Further, as shown in FIGS. 10A and 10B, a fuse accommodation portion 67G is provided on the opposite left and right sides of the swollen portion 67E such that it is swollen forwardly in comparison with the swollen portion 67E. Consequently, a dead space sidewardly of the swollen portion 67E can be utilized to accommodate the fuse 75 (refer to FIG. 8) efficiently.

FIG. 8 is a view illustrating a state in which the maintenance lid 67 is removed from the accommodation box 19.

A pair of fuses 75 are disposed on the opposite left and right sides rearwardly of the locking portion 19I of the accommodation box 19, and the battery 70 is disposed rearwardly of the fuses 75.

A rear portion of the battery 70 is accommodated in the sub box 69 joined to the rear wall opening 19K (refer to FIG. 9) of the accommodation box 19. A front portion of the battery 70 projects into the inside of the space 65 of the accommodation box 19, and electrodes 72 are provided on an upper face of the front portion. In particular, the electrodes 72 of the battery 70 extend into a projection plane from an upper face of the upper face opening 19A, and in a state in which the maintenance lid 67 is removed, the electrodes 72 of the battery 70 are positioned in the space 65 and exposed as viewed in top plan. Electric wires 73 are connected to the electrodes 72 of the battery 70 and extend to the outside through an electric wire hole 19M (refer to FIG. 5) provided in the bottom portion 19B of the accommodation box 19.

Consequently, in the state in which the maintenance lid 67 is removed, since the electrodes 72 of the battery 70 and the electric wires 73 connected to the electrodes 72 are exposed as viewed in top plan, when the electric wires 73 are attached to or removed from the electrodes 72 of the battery 70, the working can be carried out from above, which makes the working posture easy. Further, since light from above is not intercepted, the workability is improved.

Figure 11:
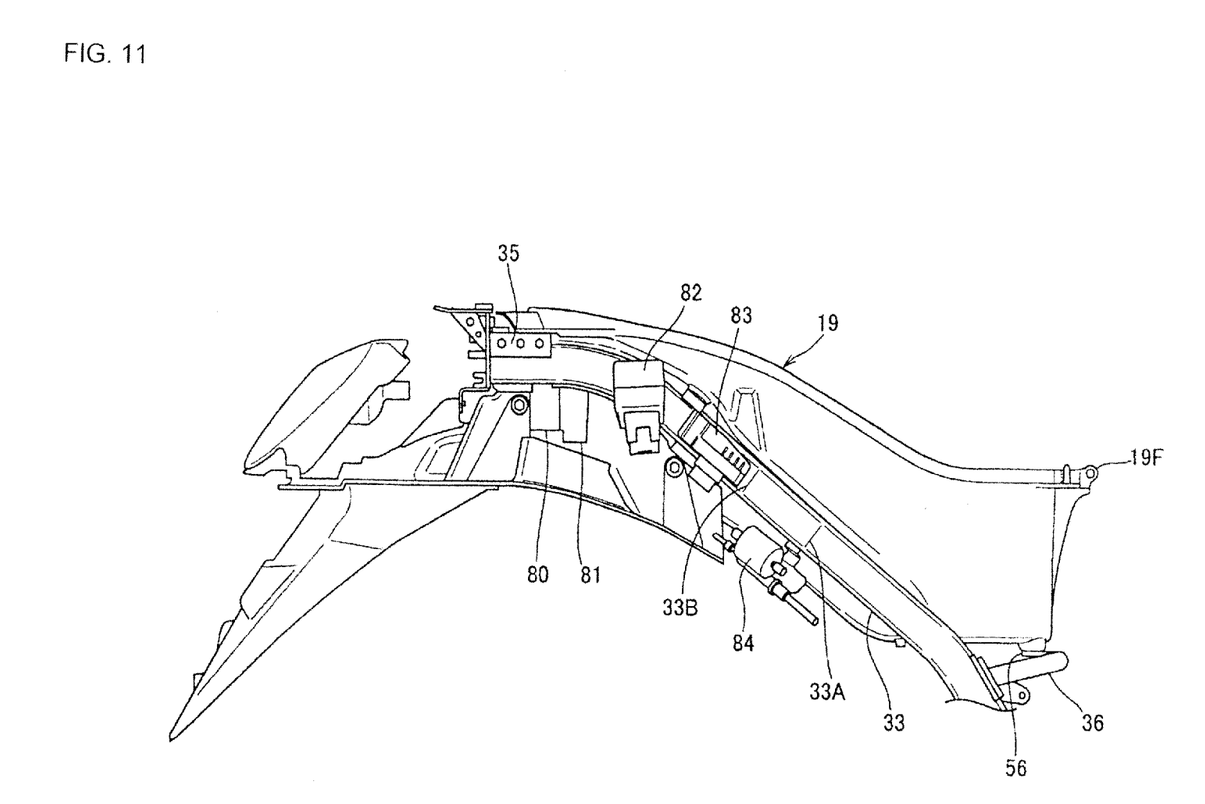
FIG. 11 is a right side elevational view of the accommodation box.

Electric parts at a rear portion of the rear frames 33 are described below. As shown in FIG. 2, the distance between the left and right rear frames 33 exhibits, rearwardly of the first bent portion 33A, gradual reduction of the width to the second bent portion 33B and is uniform with the reduced width from the second bent portion 33B to the rear ends. Consequently, at a portion of the rear frames 33 rearwardly of the first bent portion 33A, a space in which a part is to be disposed is assured on the outer sides of the rear frames 33. Then, as shown in FIG. 11, at a portion rearwardly of the first bent portion 33A of the right side one of the rear frames 33, a lighting cut relay 80, a starter relay 81, an ECU 82, a regulator/rectifier 83, and an ignition coil 84 are supported in this order from the rear.

The electric wires 73 connected to the electrodes 72 of the battery 70 are branched into a plurality of electric wires (not shown) and extend outwardly from the electric wire hole 19M (refer to FIG. 5) provided on the rear side of a rear portion of the bottom portion 19B of the accommodation box 19. The electric wires are connected to the lighting cut relay 80, starter relay 81 and regulator/rectifier 83.

In the present embodiment, those electric parts which are connected to the battery 70 directly or through the fuse 75, that is, the starter relay 81, lighting cut relay 80 and regulator/rectifier 83, are disposed in the proximity of the battery 70, and therefore, the wiring line distance can be made short and electric power loss can be prevented.

In the present embodiment, the rear frames 33 pass in the proximity of the upper face opening 19A of the accommodation box 19 and extend to the rear of the accommodation box 19. If the battery 70 is accommodated above the rear frames 33, then the vehicle height becomes greater, and if the battery 70 is disposed rearwardly of the rear frames 33, then the vehicle length becomes greater. According to the present embodiment, since the sub box 69 which accommodates the battery 70 therein is disposed below the rear cross frame 35 which connects portions of the left and right rear frames 33 to each other rearwardly of the accommodation box 19, the dead space below the rear cross frame 35 can be utilized to assure the accommodation space for the battery 70 without increasing vehicle height or vehicle length.

The sub box 69 extending below the rear cross frame 35 can be welded to a rear end portion of the accommodation box 19, and the battery 70 is accommodated in the sub box 69. With the structure, although the sub box 69 is pushed down by the weight of the battery 70, since the projection 69D is provided on the rear wall 69C of the sub box 69 and this projection 69D is inserted in the support hole 35D provided in the rear cross frame 35 to support the sub box 69, even if the sub box 69 is pushed down by the weight of the battery 70, the sub box 69 can be supported firmly by the rear cross frame 35.

Further, in the present embodiment, since the sub box 69 and the accommodation box 19 are integrated with each other and attached to the rear frames 33, handling upon attachment is facilitated and the attaching work is simplified.

Further, in the present embodiment, the sub box 69 and the accommodation box 19 are both made of resin, and the sub box 69 is attached to the accommodation box 19 by welding or adhesive. Light-weighted resin is used as the material and welding or adhesive which exhibits a high joining strength is used as the joining method. Therefore, the sub box 69 can be supported firmly while weight saving of the sub box 69 and the accommodation box 19 is achieved.

Further, in the present embodiment, the battery 70 is disposed such that, in a state in which the maintenance lid 67 is open, the electrodes 72 of the battery 70 are exposed as viewed in top plan.

Since the electrodes 72 of the battery 70 are exposed as viewed in top plan in the state in which the maintenance lid 67 is open, the electrodes 72 of the battery 70 can be accessed from above. Also, since light from above is not intercepted, it is easy to see in the proximity of the electrodes 72, attaching or removing of the electric wires 73 connected to the electrodes 72 is facilitated.

Further, in the present embodiment, the maintenance lid 67 includes the swollen portion 67E provided on the face thereof on the battery 70 side such that it is swollen until it abuts with the battery 70, and includes the recessed portion 67F at a position of the face on the opposite side thereof which corresponds to the swollen portion 67E. Since the swollen portion 67E contacts with the battery 70, the battery 70 can be held down by the swollen portion 67E and positional displacement or vibration of the battery 70 can be prevented. Further, since the recessed portion 67F is provided, when the seat 20 is opened and the maintenance lid 67 is accessed from the upper face opening 19A of the accommodation box 19 and removed from the maintenance lid 67, it is easy to hold the maintenance lid 67, resulting in improvement in workability.

Further, in the present embodiment, since the maintenance lid 67 includes the fuse accommodation portion 67G sidewardly of the swollen portion 67E, the dead space can be utilized effectively.

Since the sub box 69 overlaps with the rear frames 33 as viewed in side elevation, the battery 70 can be protected by the rear frames 33.

Since the battery 70 is positioned at a lower portion of a rear end of the accommodation box 19, a high capacity of the accommodation box 19 can be provided. Further, since the bottom portion 19B of the accommodation box 19 does not have a concave or convex shape which avoids the battery 70, luggage can be accommodated readily into the accommodation box 19.

DESCRIPTION OF REFERENCE SYMBOLS

10: Motorcycle
11: Vehicle body frame
19: Accommodation unit
20: Seat
33: Rear frame
35: Rear cross frame
67: Maintenance lid
67E: Swollen portion
67F: Recessed portion
67G: Fuse accommodation portion
19: Accommodation box (Accommodation box)
19A: Upper face opening (Upper opening)
69: Sub box (Electric part accommodation section)
69B: Opening (Opening for maintenance)
70: Battery
72: Electrode

The invention claimed is:
1. A saddle-type vehicle, comprising:
an accommodation box, said accommodation box including an upper opening provided therein;
a pair of left and right rear frames disposed at a rear portion of the vehicle, so as to extend in a forward and rearward direction;
a seat configured to cover the upper opening of the accommodation box, said seat configured to be opened and closed to enable access to the accommodation box;
an electric part accommodation section disposed at one end of the accommodation box, said electric part accommodation section including a maintenance opening therein, said electric part accommodation section including a maintenance lid for opening and closing access to the maintenance opening section,
wherein the rear frames are disposed, at a rear portion of the accommodation box, adjacent the upper opening of the accommodation box, and wherein a rear cross frame connects the left and right rear frames to each other, and wherein the electric part accommodation section is at least partially disposed inside of the accommodation box at a location which is directly below the rear cross frame,
wherein the electric part accommodation section comprises a rear wall,
wherein the electric part accommodation section comprises a projection attached to the rear wall, and wherein the projection is configured to be inserted in, and fixed to, a support hole of the rear cross frame.

2. The saddle-type vehicle according to claim 1, wherein the electric part accommodation section is supported by the rear cross frame.

3. The saddle-type vehicle according to claim 1, wherein the electric part accommodation section is integrated with the accommodation box, and attached to the rear cross frame.

4. The saddle-type vehicle according to claim 3, wherein the accommodation box and the electric part accommodation section each comprise a resin housing, and wherein the electric part accommodation section is attached to the accommodation box.

5. The saddle-type vehicle according to claim 4, wherein the electric part accommodation section is attached to the accommodation box by adhesion.

6. The saddle-type vehicle according to claim 1, further comprising:
a battery disposed in the electric part accommodation section, wherein an electrode of the battery is exposed when the maintenance lid of the electric part accommodation section is opened.

7. The saddle-type vehicle according to claim 6, wherein the electric part accommodation section overlaps one of the left and right rear frames.

8. The saddle-type vehicle according to claim 1, wherein the maintenance lid comprises a swollen portion on one side thereof, and a corresponding recess portion on an opposite side thereof, said swollen portion being configured to contact the battery.

9. The saddle-type vehicle according to claim 8, wherein the maintenance lid comprises a fuse accommodation section therein.

10. The saddle-type vehicle according to claim 9, wherein the fuse accommodation section is disposed adjacent the swollen section.

11. A saddle-type vehicle, comprising:
accommodation means for accommodating items therein;
frame means disposed at a rear portion of the vehicle, said frame means including left and right frame means disposed at a rear portion of the vehicle so as to extend in a forward and rearward direction, said frame means for providing a supporting structure for the vehicle;
seat means disposed adjacent an upper opening of the accommodation means, said seat means for supporting a rider, and configured to be opened and closed to enable access to an interior of the accommodation means;
electric part storage means disposed at one end of the accommodation means, said electric part storage means including a maintenance opening therein, said electric part storage means including maintenance lid means for opening and closing access to the maintenance opening section,
wherein the frame means are disposed, at a rear portion of the accommodation means, adjacent the upper opening of the accommodation means, and wherein a rear cross frame means is provided for connecting the left and right rear frame means to each other, and wherein the electric part storage means is at least partially disposed inside of the accommodation means at a location which is directly below the rear cross frame means, wherein the electric part storage means comprises a rear wall, wherein the electric part storage means comprises a projection means attached to the rear wall, and wherein the projection means is configured to be inserted in, and fixed to, a support hole of the rear cross frame means.

12. The saddle-type vehicle according to claim 11, wherein the electric part storage means is supported by the rear cross frame means.

13. The saddle-type vehicle according to claim 11, wherein the electric part storage means is integrated with the accommodation means, and attached to the rear cross frame means.

14. The saddle-type vehicle according to claim 13, wherein the accommodation means and the electric part storage means each comprise a resin housing, and wherein the electric part storage means is attached to the accommodation means.

15. The saddle-type vehicle according to claim 14, wherein the electric part storage means is attached to the accommodation means by adhesion.

16. The saddle-type vehicle according to claim 11, further comprising:
a battery disposed in the electric part storage means, wherein an electrode of the battery is exposed when the maintenance lid means of the electric part storage means is opened.

17. The saddle-type vehicle according to claim 16, wherein the electric part storage means overlaps one of the left and right rear frame means.

18. The saddle-type vehicle according to claim 11, wherein the maintenance lid means comprises a convex section on one side thereof, and a corresponding concave section on an opposite side thereof, said convex portion being configured to contact the battery.

19. The saddle-type vehicle according to claim 18, wherein the maintenance lid means comprises fuse accommodation means therein, said fuse accommodation means for accommodating fuses.

20. The saddle-type vehicle according to claim 19, wherein the fuse accommodation means is disposed adjacent the convex section.

* * * * *